No. 855,011. PATENTED MAY 28, 1907.
A. F. LEAR.
TYPE WRITING MACHINE.
APPLICATION FILED MAR. 30, 1907.
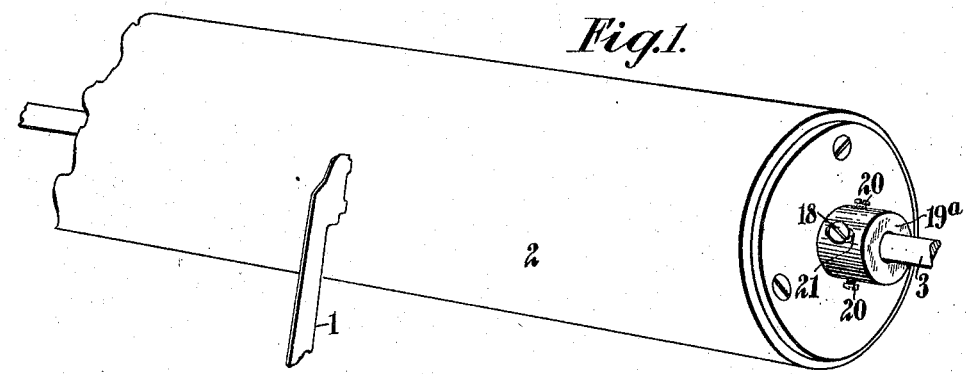
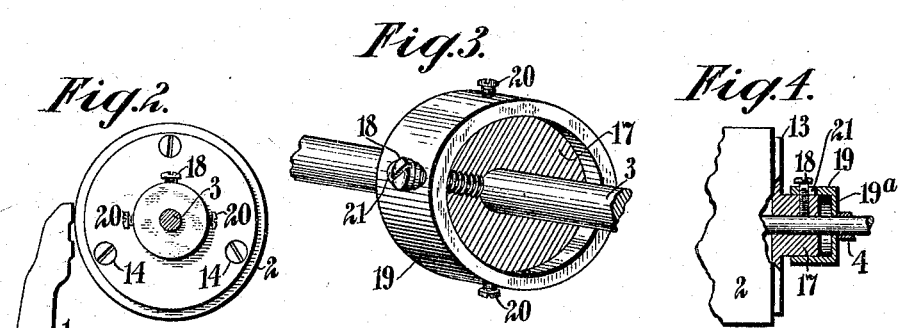
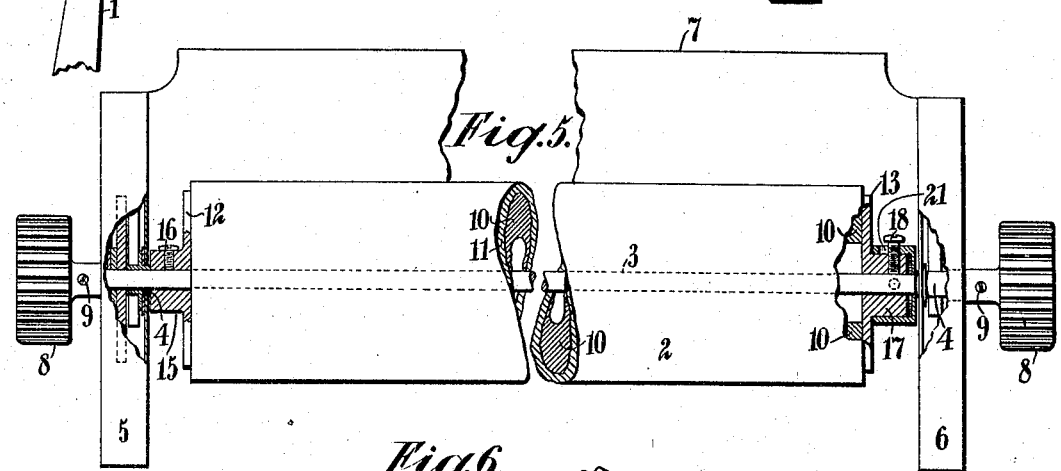
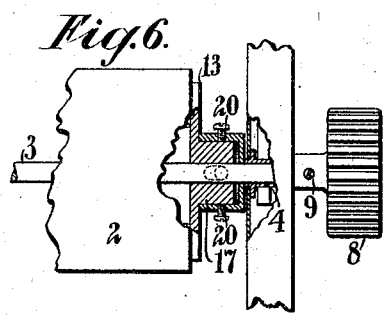
Witnesses:
K. Frankfort.
H. G. Fleischer.
Inventor:
Arthur F. Lear.
By his Attorney,
B. C. Stickney

UNITED STATES PATENT OFFICE.

ARTHUR F. LEAR, OF NEW YORK, N. Y., ASSIGNOR TO UNDERWOOD TYPEWRITER COMPANY, OF NEW YORK, N. Y., A CORPORATION OF NEW JERSEY.

TYPE-WRITING MACHINE.

No. 855,011.　　　Specification of Letters Patent.　　　Patented May 28, 1907.

Application filed March 30, 1907. Serial No. 365,563.

*To all whom it may concern:*

Be it known that I, ARTHUR F. LEAR, a citizen of the United States, residing in the borough of Brooklyn, New York city, in the county of Kings and State of New York, have invented certain new and useful Improvements in Type-Writing Machines, of which the following is a specification.

This invention relates to the manner of mounting revoluble platens of typewriting machines. Said platens are usually journaled in frames which are made very light in order to conduce to speed of operation of the machine, and it sometimes happens that owing to such lightness of the frame, it becomes slightly sprung or deformed, thus permitting slight endwise shake of the platen in the frame, which is highly objectionable. It has also been found impracticable, owing to unavoidable inaccuracies in manufacture, to secure an exact fit between the platen and the ends of the frame, except by going through the process of grinding off the end of the platen hub after the parts have been manufactured and are ready to assemble. In many cases the platen itself, which consists of a tube of rubber placed upon a wooden core, alters in length after it is manufactured, so that it will not fit accurately between the ends of the platen frame. For these and other reasons, it is the common practice to make platens a trifle over size and then to fit them into the platen frame by grinding the platen hubs, which is a slow and expensive process.

The object of the present invention is to provide simple, inexpensive and satisfactory means for securing an accurate fit of the platen in the platen frame.

To this end, I place upon one of the platen hubs a device in the form of a ferrule which fits closely upon the hub, and is adjustable axially with the effect of lengthening or shortening the hub, as may be desired; the end of said ferrule contacting with the bearing or journal which is provided in the platen frame; so that any shake or looseness of the platen in the platen frame is readily taken up. I also provide means for firmly securing the ferrule wherever it is adjusted.

In the accompanying drawings, Figure 1 is a perspective view of a platen provided with my improvements. Fig. 2 is an end view thereof showing the platen axle in section. Fig. 3 is an enlarged perspective view showing a portion of the platen hub in section, and also showing the open end of the ferrule in position thereon, and the platen axle passing through the hub and the ferrule. Fig. 4 is a sectional view illustrating the manner of securing the hub to the axle; the ferrule being illustrated as adjusted to the right as far as it will go. Fig. 5 is a part sectional plan of a platen frame of an Underwood typewriting machine provided with my improvements; the ferrule being shown as adjusted to the left as far as it will go. Fig. 6 is a part sectional view of the right hand end of a platen and platen frame, and is similar to Fig. 5, except that the platen has been given a quarter of a revolution from the Fig. 5 position, so as to show the set screws which secure the ferrule upon the hub of the platen.

In the Underwood typewriting machine, types 1 strike upon the front side of a platen 2 which is secured upon an axle 3, the latter mounted in journals or bearings 4 in the ends 5, 6, of a platen frame, which also comprises a rear plate or paper shelf 7. The axle 3 projects outside of the platen frame and carries hand wheels 8, which are releasably secured by set screws 9.

The platen usually comprises a wooden core 10 having a rubber sheath 11. Metallic heads 12 and 13 are secured upon the core 10 by screws 14. The left hand head 12 has a hub 15 through which passes a set screw 16 to secure the hub to the axle. The right hand head 13 has a similar hub 17 through which passes a similar screw 18, both hubs being usually secured to the platen axle 3. It will be understood, that when it is desired to remove the platen, it is only necessary to loosen one of the screws 9 and both of the screws 16 and 18, whereupon the axle, which passes through the hubs and through the bearings 4 can be pulled out of the machine, thus releasing the platen.

Upon the right hand hub 17 is shown a ferrule 19 which fits closely upon the hub and is adjustable axially thereon. The closed end 19ª of the ferrule is intended to bear directly against the bearing or journal 4, which is usually in the form of a boss riveted upon the end of the platen frame.

When the platen has been inserted in the platen frame, the ferrule 19 is adjusted along the hub 17 to take up the endwise play of the platen 2 in the platen frame, or so that the end 19ª of the ferrule bears against one of the fixed bosses 4, while the hub 15 at the other end of the platen bears against the other fixed boss 4, so that the platen cannot shake. Thereupon set screws 20 threaded into the ferrule are turned in to bear against the periphery of the hub, as at Fig. 5, thereby firmly securing the ferrule where it has been adjusted.

The ferrule has a longitudinal slot 21 to receive the shank of the screw 18, said slot permitting the described adjustment of the ferrule independently of said screw 18.

It will be observed that the ferrule affords inexpensive and readily applied means for taking up endwise play of the platen, and that I avoid the necessity of repeatedly removing the platen from the machine for grinding the end of the platen hub and replacing it in the machine for a test until an exact fit is secured. A precise fit of any platen in any suitable platen frame may be secured by a moment's manipulation after the platen is placed in the machine.

When the platen is removed, the adjustment of the ferrule thereon is not disturbed, so that the platen can be immediately put back and secured without the necessity of refitting or re-adjusting of parts.

Having thus described my invention, I claim:

1. In a typewriting machine, the combination with a frame having ends, each provided with a bearing, of a platen having heads, an axle passing through said heads and journaled in said bearings and having finger-wheels attached thereto outside of said platen frame, one of said heads being provided with an exterior hub, a device in the form of a ferrule fitting upon said hub and adjustable axially to take up longitudinal play of the platen between said bearings, and means to secure said ferrule to the hub at various adjusted positions, the platen being removable from the frame by withdrawing the axle, and the ferrule being removable with the platen without disturbing the adjustment of the ferrule on the platen.

2. In a typewriting machine, the combination with a frame having ends, each provided with a bearing, of a platen having heads, an axle passing through said heads and journaled in said bearings and having finger-wheels attached thereto outside of said platen frame, one of said heads being provided with an exterior hub, a device in the form of a ferrule fitting upon said hub and adjustable axially to take up longitudinal play of the platen between said bearings, means to secure said ferrule to the hub at various adjusted positions, and a screw threaded into said hub to secure it to said axle; said ferrule having a slot for said screw, the platen being removable from the frame by withdrawing the axle, and the ferrule being removable with the platen without disturbing the adjustment of the ferrule on the platen.

3. In a typewriting machine, the combination with a frame having ends, each provided with a bearing, of a platen having heads, an axle passing through said heads and journaled in said bearings and having finger-wheels attached thereto outside of said platen frame, one of said heads being provided with an exterior hub, a device in the form of a ferrule fitting upon said hub and adjustable axially to take up longitudinal play of the platen between said bearings, set screws threaded into said ferrule to bear against the periphery of said hub and lock the ferrule upon the hub, and a screw threaded into said hub to bear upon said axle; the ferrule being slotted to receive the shank of the last-mentioned screw, the platen being removable from the frame by withdrawing the axle, and the ferrule being removable with the platen without disturbing the adjustment of the ferrule on the platen.

ARTHUR F. LEAR.

Witnesses:
 KITTIE FRANKFORT,
 CLARA RIPLEY.